United States Patent [19]

Vinel

[11] Patent Number: 5,260,932
[45] Date of Patent: Nov. 9, 1993

[54] APPARATUS EVALUATING THE DATA RATES OF VIRTUAL CIRCUITS OCCUPYING AN ASYNCHRONOUS TIME-MULTIPLEXED TRANSMISSION PATH

[75] Inventor: Paul Vinel, Velizy, France

[73] Assignee: Alcatel Cit, Paris, France

[21] Appl. No.: 732,531

[22] Filed: Jul. 19, 1991

[30] Foreign Application Priority Data

Jul. 24, 1990 [FR] France .................. 90 09441

[51] Int. Cl.$^5$ .................. H04J 1/16; H04J 3/14; H04J 3/24
[52] U.S. Cl. .................. 370/13; 370/94.1; 370/17
[58] Field of Search .................. 370/17, 94.1, 13, 60, 370/58.1, 58.2, 58.3

[56] References Cited

U.S. PATENT DOCUMENTS

| | | | |
|---|---|---|---|
| 5,119,364 | 6/1992 | Thiebaut et al. | 370/94.1 |
| 5,132,961 | 7/1992 | Thiebaut et al. | 370/13 |
| 5,138,607 | 8/1992 | Thiebaut et al. | 370/13 |
| 5,140,588 | 8/1992 | Danner | 370/17 |

Primary Examiner—Douglas W. Olms
Assistant Examiner—Atit Patel
Attorney, Agent, or Firm—Sughrue, Mion, Zinn, Macpeak & Seas

[57] ABSTRACT

An apparatus for evaluating data rates of virtual circuits occupying an asynchronous time-multiplexed transmission path includes a memory in which each virtual circuit is allocated space containing a context defining conditions for evaluating the data rate of the virtual circuit. This context contains a starting time which was the current time as recorded on receiving an earlier cell in the virtual circuit under consideration. Each time a cell is received, the context of the virtual circuit to which the cell belongs is read, and the starting time is subtracted from the new current time, with the time difference established in this way constituting the basis on which the data rate is evaluated, and with repressive countermeasures being initiated in the event of the data rate being excessive. The apparatus further includes device for cyclically scanning the contexts and for incrementing a scan cycle counter in each context during the cyclic scanning, the scan cycle counter having an initial position. The apparatus is also responsive to the arrival of a cell to read the scan cycle counter, to observe its relative position relative to its initial position, and when the observed relative position corresponds to a given number of scan cycles, to inhibit any repressive countermeasures.

5 Claims, 2 Drawing Sheets

APPARATUS EVALUATING THE DATA RATES OF VIRTUAL CIRCUITS OCCUPYING AN ASYNCHRONOUS TIME-MULTIPLEXED TRANSMISSION PATH

The present invention relates to an apparatus for evaluating the data rates of virtual circuits occupying an asynchronous time-multiplexed transmission path, and more particularly, it relates to such an apparatus adapted to cope with interruptions in the transmission of virtual circuits.

BACKGROUND OF THE INVENTION

An asynchronous time-multiplexed transmission path is a transmission path conveying data messages in digital data structures called "cells". Each cell comprises a header, constituted by four 8-bit characters for example, together with a message body constituted by a defined number of characters, e.g. 32. On the transmission path, such cells follow one another without interruption. If there is no message to be transmitted, then the transmission path is occupied by an "empty" cell, i.e. a cell having the same format as a message cell and containing easily-recognized conventional information. Dispositions are taken to maintain a sufficient proportion of such empty cells in the flow of message cells.

The header of each message cell includes two characters, for example, containing information addressed to the reception end of the transmission path to define the destination towards which the message body is to be forwarded. The other two characters of the header contain service information. The same destination information is to be found in cells that are irregularly spaced apart but that all belong to the same call. The destination information thus defines a kind of virtual circuit allocated to the call and occupying a portion of the total transmission capacity of the transmission path. More generally, the virtual circuit occupies the transmission path by applying a certain data rate thereto, e.g. measured in cells per unit time, and this data rate fluctuates relative to a nominal data rate allocated to the virtual circuit because of the characteristics of the message source and/or because of the characteristics of other transmission equipments through which the call hax already passed. The main object of the apparatus the invention is to measure this fluctuating data rate.

At any given instant, the transmission path is occupied by a plurality of virtual circuits whose cells are interleaved irregularly in a so-called "asynchronous time-multiplex". The nominal data rates of the various virtual circuits are different. Each data rate fluctuates, and the sum of these fluctuating data rates is limited by the maximum data rate of the transmission path. The sum also fluctuates, thereby leaving room for the transmission of empty cells.

Further, the number of separately-identifiable virtual circuits is very high, and may be as much as 64K, for example. Only a small number of them are active at the same time.

The transmission path provides cells which it conveys to switching and transmission equipment situated downstream therefrom, which equipment also receives cells from other transmission paths. To avoid the risk of clogging such equipment, each virtual circuit should be verified to ensure that none of them, whether by fraud or by failure, continues for long to deliver a data rate which is greater than the nominal data rate allocated thereto. Should that happen, it is accepted that repressive countermeasures should be taken to prevent the transmission path conveying any cells that are considered to be in excess relative to the nominal data rate of the virtual circuit. A second object of the present invention is thus to provide such repressive countermeasures.

U.S. Pat. No. 5,119,364, U.S. Pat. No. 5,138,607 and U.S. Pat. No. 5,132,961 describe a method of evaluating the data rate of virtual circuits to enable the above-defined objects to be achieved, which method is based on using a memory in which each virtual circuit has space allocated thereto containing "context" data defining the conditions under which the data rate of the virtual circuit is evaluated and containing information resulting from earlier steps in the evaluation. This method also uses a clock designed to deliver a current time expressed in units associated with the virtual circuit. Each time a cell is received, the context of the virtual circuit to which the cell belongs is read. This context contains a starting time which was the current time as observed and recorded when an earlier cell of the virtual circuit under consideration was received. This starting time is subtracted from the present current time, and the time difference established in this way together with the number of cells observed between the present cell and the cell that gave rise to the starting time being recorded constitutes the basis on which the data rate is evaluated: it is possible to deduce either the number of cells over a given time interval by waiting for the time difference reaches the given time interval, or else the time required for receiving a given number of cells, by waiting until for said cell number to be reached.

In either case, the information on which data rate evaluation is based is a time difference established between a current time which is in the form of a digital quantity provided by a clock, and a starting time which is in the form of a similar digital quantity provided by the clock earlier on and recorded in the context. This time difference is determined on the arrival of a cell. Other data rate evaluation methods may be designed that also make use of such a time difference.

In such cases, a problem arises if the clock provides its value on a limited number of bits (which is particularly advantageous since reducing the number of bits makes it possible to limit the volume of the context for each virtual circuit), and if there is a prolonged interruption in the transmission of cells on a given virtual circuit, in which case it may happen that the clock performs one or more complete cycles before the arrival of a new cell of that virtual circuit. The time difference which is then obtained no longer represents the time lapse between the new cell and the preceding cell that gave rise to the starting time being recorded. This can therefore lead to a wrong decision and that is unacceptable when the effect of such a decision is to eliminate a cell.

A specific object of the present invention is thus to provide means that avoid such wrong decisions being taken.

SUMMARY OF THE INVENTION

According to the invention, the apparatus further includes means for cyclically scanning said context and, during said cyclic scanning, and for incrementing a scan cycle counter in each context, which counter has an initial position, together with additional means responsive to the arrival of a cell to read the scan cycle counter, to observe its position relative to its initial position, and when the observed relative position corresponds to a given number of scan cycles, and said number being greater than one, to inhibit any repressive countermeasures.

Said given number may be a threshold value recorded in the context.

Said initial position may be a determined position such as zero, and said scan cycle counter is reset to its initial position whenever data rate evaluation processing is being performed for each received cell that refers to the context under consideration.

In a variant, said initial position is given by a marker value recorded in the context, and the position of said scan cycle counter is written into the context as a new initial position during the data rate evaluation processing of each received cell that refers to the context under consideration.

The apparatus may further include means for giving a maximum value that said time difference may take up and for giving a minimum value that may be taken up by the counted number of cells, for the purpose of restarting the evaluation process from a situation in which it is assumed that no cell has been received during a maximum time interval to be taken into consideration.

BRIEF DESCRIPTION OF THE DRAWINGS

Embodiments of the invention are described by way of example with reference to the accompanying drawings, in which.

MORE DETAILED DESCRIPTION

The following description is based on the description of the apparatus for evaluating virtual circuit data rates given in U.S. Pat. No. 5,119,364, which description is repeated sufficiently herein to enable the person skilled in the art to understand easily how the present invention is situated and how it acts. Naturally this is merely one example of an application, and the invention may be applied in the same way to similar evaluation apparatuses.

Figure 1:
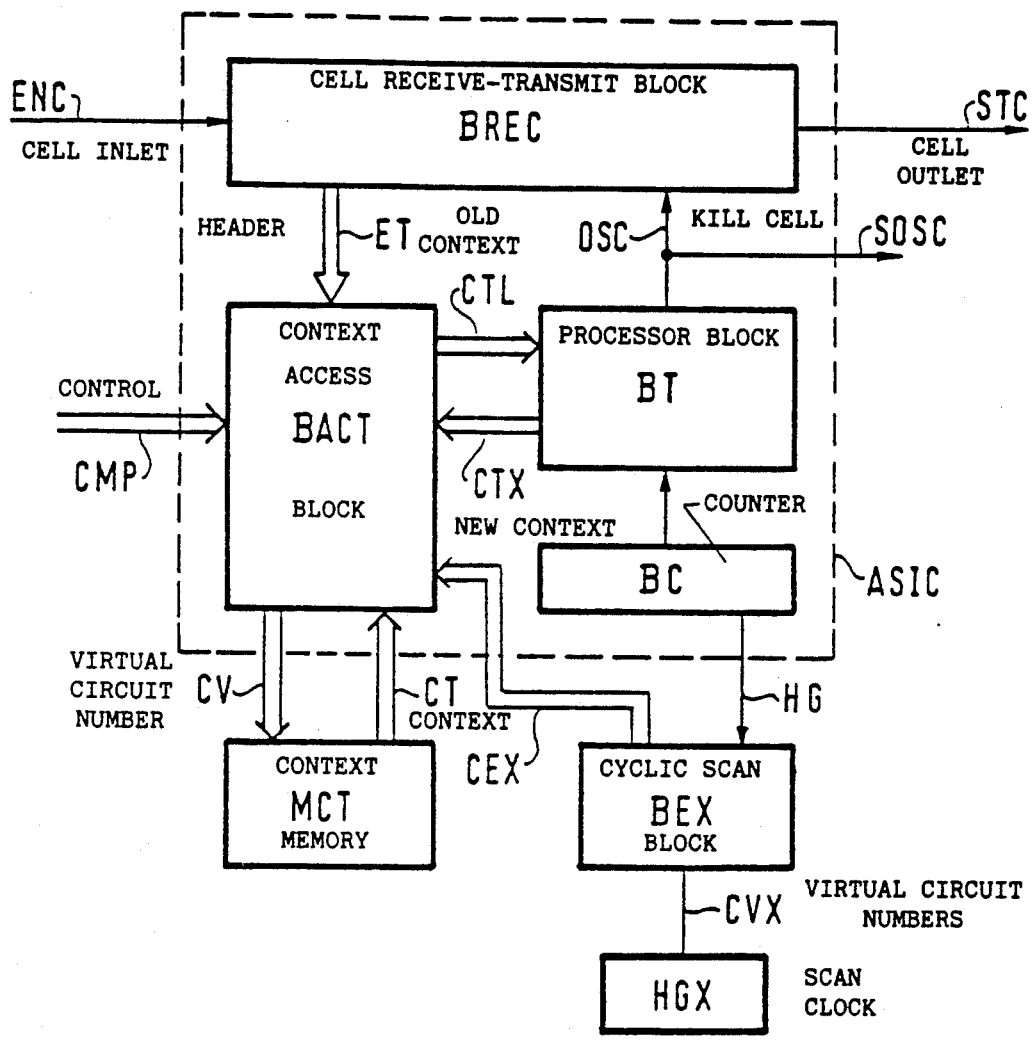
FIG. 1 is a block diagram of an embodiment of the present invention.

The data rate evaluation system shown in FIG. 1 and incorporating the present invention is interposed between a cell inlet ENC and a cell outlet STC. It is thus interposed on an asynchronous time-multiplexed transmission path of the type defined in the preamble of the present application. By way of concrete example, the bit rate of the transmission path received at the inlet ENC may be 600 Mbit/s. This data passes through a cell receive-transmit block BREC which can be thought of as being a simple shift register. So long as the data rates of the virtual circuits conveyed by the link are acceptable, each cell received at the inlet ENC is merely retransmitted to the outlet STC with a delay equal, for example, to the time required for transmitting one cell, i.e. about 0.5 μs.

As soon as the header of a cell is available in the block BREC, the header ET is delivered to a virtual circuit context access block BACT. In the block BACT, the virtual circuit number CV is applied as an address to a context memory MCT to read the context CT of the virtual circuit to which the received cell belongs. The context CT comprises a certain amount of digital information, some of which is semi-permanent, i.e. fixed for the duration of a call using the virtual circuit, and the remainder of which is modifiable, i.e. may be changed each time a cell of the virtual circuit is received. The context thus contains information defining the "past" of the virtual circuit. The access block BACT delivers the context as read, now referenced CTL, to the processor block BT which also has time information made available by a counter block BC. On the basis of these two items of information, the processor block BT generates an updated context CTX which is returned to the access block BACT to be written back to the same address CV, and it also provides a signal OSC in the event that the result of the data rate evaluation with respect to the received cell demonstrates the need to take repressive counter-measures, as explained above.

The updated context CTX contains modifiable information that may have been changed by the program of the processor block BT as a function of the fact that a cell has been received, and above all as a function of the arrival time of the cell as given by the counter block BC.

The signal OSC is transmitted to the block BREC in which, in one implementation, it has the effect of replacing the received cell with an empty cell. In another implementation, the signal OSC merely marks a flag provided in the cell header, with such a flag informing downstream switching members that the cell need not be retransmitted in the event of overload. Other applications for the signal OSC may be envisaged, and this is represented by an outlet SOSC for the signal OSC.

The time taken by the blocks BACT and BT to perform the above-described operations is advantageously no longer than the time required for transmitting one cell, thereby ensuring that the blocks are immediately available for a new operating cycle as soon as the following cell is received. However, as is well known in the art, it is also possible to organize the functions of the two blocks in such a manner that the operations of reading, processing, and rewriting a context for a received cell overlap the same operations relating to the following cell, thereby giving both the access block BACT and the processor block BT the full duration of a cell for performing operations relating to that cell.

The context information CT is initially written into the memory MCT by a control processor (not shown) which communicates with the access block BACT via a control link CMP. On each occasion, the control processor provides a virtual circuit address CV and context information CT. For example, the access block BACT may be provided with means for identifying empty cells and it may write a new context during the time taken to receive each empty cell. This function may also be performed during a portion of the normal operating cycle of the block BACT.

Finally, the block BACT includes devices for monitoring its own operation and the control processor reads operation reports via the link CMP.

The blocks BREC, BACT, BT, and BC are shown inside a dashed line box since they may be implemented together in the form of a custom integrated circuit (ASIC) as described below.

To these dispositions, the invention adds a cyclic scan block BEX which receives virtual circuit numbers to be scanned CVX from a scan clock HGX. For each number CVX, the block BEX delivers the number CVX to the access block BACT via a scan control link CEX, with the block BACT addressing the corresponding context CT and causing the contents thereof to be modified in a simple manner that is described below by the processor block BT, and then rewriting the context CT as modified. Such an operation may be performed one or more times, i.e. for one or more virtual circuit contexts within time intervals that are reserved for this purpose within a cell transmission time. The scanning function is thus interlaced with normal evaluation processing applicable to cells passing though the evaluation apparatus. The clock HGX is organized to provide the numbers of all of the virtual circuits in succession, regardless of whether or not they are active.

A detailed description of the receive-transmit block BREC is not given below, but essentially it comprises a shift register, nor is a detailed description given of the counter block BC which is merely a simple binary counter incrementing by one step for each period of an incorporated clock and thus passing cyclically through all of its possible states. Nor is a detailed description given of the access block BACT whose functions are clearly defined above and whose implementation depends on the technology used for the memory MCT and is conventional for the person skilled in the art. The same applies to the scanning block BEX which receives clock pulses HG from the counter block BC and causes the clock HGX to advance accordingly on receiving each of them, while also triggering a context scan operation by the access block BACT.

Reference is now made to FIGS. 2 to 5 while describing the processor block BT only, and then only in part, sufficient to enable the embodiment of the invention to be understood.

Figure 2:
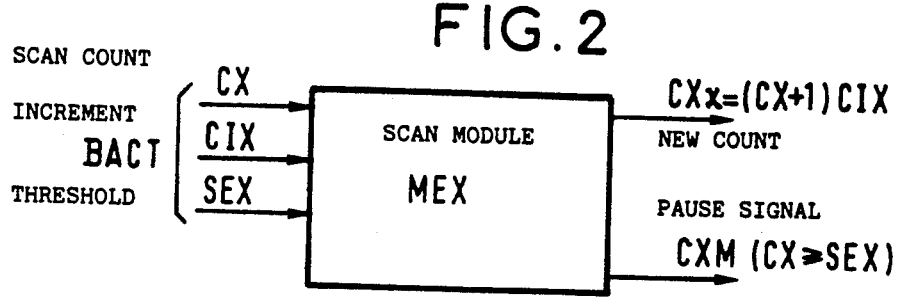
FIG. 2 shows a scan circuit module included in the processor block BT of FIG. 1.

FIG. 2 shows a scan circuit module MEX included in the processor block BT. As soon as the context of a virtual circuit CT is read by the block BACT the scan circuit module MEX receives from the access block BACT the contents CX of a scan counter memory zone in the context CT. If the context CT is being read in the context of the scanning function provided by the present invention and under the control of the scan block BEX (see FIG. 1), then the block BACT also provides an increment control signal CIX. In response, the module MEX delivers a new value $CXx=(CX+1)$. CIX to the access block BACT, i.e. the old value plus unity when the signal CIX is present, and this new value is recorded in said scan count zone in the context CT. Insofar as the scanning controlled by the block BEX is cyclic and covers all of the contexts of all of the virtual circuits, it can thus be seen that each scan count CX is incremented by one step during each scan cycle.

Further, if the signal CIX is not present while the context CT is being read, then that means that reading is not taking place in the context of cyclic scanning, but in the context of a cell being received, and as a result the scan circuit module MEX delivers a new value CXx of zero since CIX is equal to zero. The scan count is thus reinitialized each time a cell is received. Consequently, on cell reception, the value CX gives the number of scan cycles that have caused the value CX to be incremented since the previous cell in the virtual circuit was received.

Further, the access block BACT also provides the scan circuit module MEX of the block BT with a scan threshold value SEX read in a memory location of the context CT. Each time the context is read, the value CX is compared with this threshold. If the value of CX is equal to or greater than the threshold SEX, then a pause signal CXM is delivered for use by other circuit modules in the processor block BT. Thus, the context CT of each virtual circuit specifies a number of scan cycles after which the pause signal CXM is provided, indicating that cell transmission has been interrupted for a relatively long period of time and that consequently the data rate evaluation method needs to be modified. This is described below.

For the purpose of evaluating virtual circuit data rates, the processor block includes various modules, only three of which are described since they are considered to be particularly significant in the context of the present invention.

Figure 3:
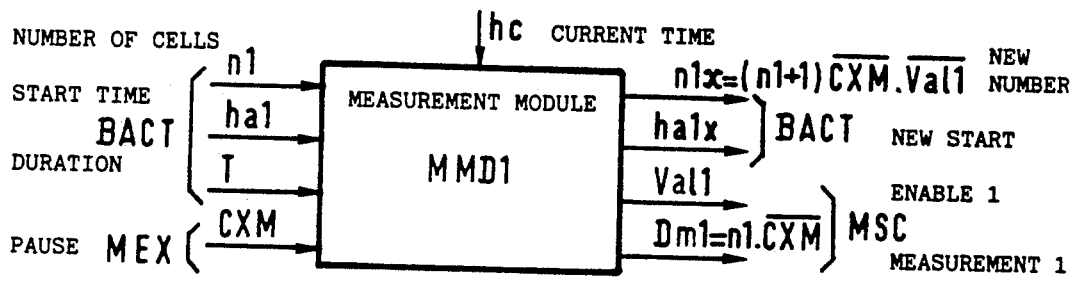
FIG. 3 shows a first measurement module MMD1 included in the processor BT of FIG. 1.

The description begins with reference to FIG. 3 and concerns a first measurement module MMD1. This measurement MMD1 receives the following information from the context CT delivered by the block BACT:

the duration T of a measurement time interval also called T;

a start time ha1 for the measurement interval T, which time was established earlier and recorded in the context CT on the basis of the current time hc; and the number n1 of cells that have already been received in the current measurement interval T.

It also receives the current time from the block BC and the pause signal CXM from the scan module MEX.

The module MMD1 establishes the time difference hc − ha1. If this time difference is less than T, then it merely delivers a new number of received calls $n1x = (n1+1).\overline{CXM}.Val1$, i.e. the preceding number plus 1, providing the pause signal delivered by the scan module MEX is not specifying that the received cell has arrived after a pause (CXM=1), and providing that the measurement time interval has not elapsed fully (Val1=1, as described below). This new number is stored in the context at the location previously occupied by the number that was read. This thus makes it possible to count cells over a measurement interval T. However, in the event of a pause of duration greater than that indicated by the value SEX (see description of FIG. 2) and if a duration greater than that of the measurement time interval is to be expected, then the signal CXM is present, the signal $\overline{CXM}$ has the value 0, and the cell count n1x is thus made equal to 0, and this corresponds to fact: no cell has been received during a time interval of not less than the measurement time interval.

In contrast, if the time difference is equal to or greater than T, the measurement module MMD1 provides a signal Val1=1. The same signal Val1=1 is also provided if the pause signal CXM is present. The signal Val1 is accompanied by a value Dm1, where $Dm1 = n1.\overline{CXM}$. This is the number of cells counted up to the arrival of the present cell, assuming that a pause has not occurred, or else it is the number zero if there has been a pause.

The module MMD1 thus normally provides a measure of the data rate in the form of the number of cells received in a given time interval. It is explained below with reference to FIG. 5 how use can be made of such a data rate measurement. If a pause has occurred, the module still provides a data rate measurement, but the measurement is now zero; this measurement is made use of in the same way.

In both of these cases where a data rate measurement is provided whether or not there has been a pause, the context CT of the virtual circuit is reinitialized by the two values n1x and ha1x which are omitted from the figure for the purposes of simplification: the initialization value of ha1x is hc, i.e. the current time, which thus provides a new starting time, and the initialization value of n1x is 1, i.e. the new received cell count is reduced to unity, which corresponds to the present cell.

On the arrival of a virtual circuit cell, measurement module MMD2 (FIG. 4) receives the context CT of the virtual circuit as delivered by the access block BACT, and it receives a starting time ha2 which in this case is the current time as recorded in the context on receiving the preceding cell of the virtual circuit. It also receives the above-mentioned pause signal CXM and the current time hc.

In response, the module MMD2 delivers a signal Val2 without any conditions, a new starting time ha2x which is the current time hc, again without any conditions and a measurement signal $Dm2 = (hc - ha2).\overline{CXM} + MAX.CXM$ which means that the measurement signal Dm2 is equal to the time difference, i.e. to the time interval which has elapsed between the preceding cell and the present cell so long as a pause has not occurred, or else it is equal to a maximum value MAX if a pause has occurred. This maximum value MAX is the maximum time interval that can be taken into account by the data rate evaluating method starting from the time interval between two consecutive cells.

In this example, it will be observed that the fact of a cell arriving after a pause is indicated by the same signal CXM as in the preceding case. This may mean that the time signal given by the threshold SEX is the same in both cases, assuming that both modes of data rate evaluation are performed simultaneously for the same virtual circuit. This means that the starting time recorded in the context for both modes has the same format. However it is clear that the signal CXM could be produced under different conditions in the two cases, by applying different threshold values SEX. In addition, if both data rate evaluation methods are performed together on the same virtual circuit, it is also possible to provide two different thresholds SEX and two different signals CXM, both provided by the module MEX of FIG. 2, with one being used by the module of FIG. 3 and the other by the module of FIG. 4.

Figure 5:
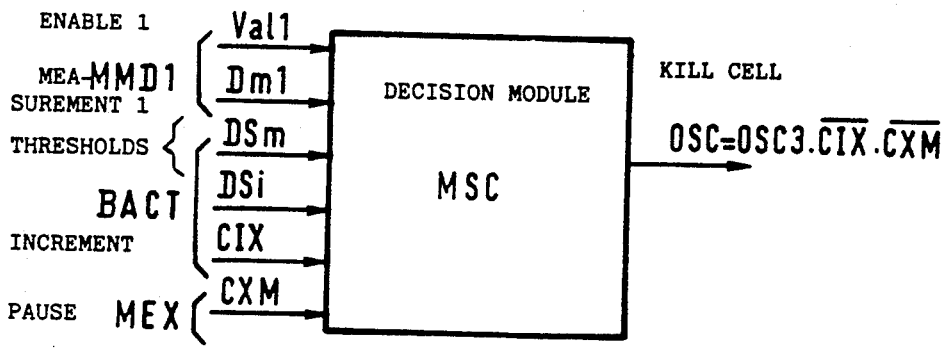
FIG. 5 shows a decision module MSC included in the processor block BT of FIG. 1.

The way in which the data rate measurements by the measurement module MMD1 are used is illustrated by FIG. 5 which shows a decision module MSC which receives both the enable signal Val1 and the measurement result signal Dm1 from the measurement module MMD1. This decision module also receives the pause signal CXM from the scan module MEX plus the following from the context CT and via the access block BACT: two thresholds DSm and DSi, together with the above-mentioned scan signal CIX. The threshold DSm is the maximum number of cells that the virtual circuit in question must not exceed at any time within a measurement time interval. The threshold DSi is a threshold relating to the number of cells counted over the entire measurement interval which the virtual circuit in question is authorized to reach under normal traffic conditions, but when exceeded it gives rise to special processing that lies outside the scope of the present invention and is therefore not described.

The decision module MSC responds by comparing the measurement results Dm1 with the thresholds DSm and DSi. The signal OSC3 is generated whenever the measurement Dm1 is equal to or greater than the number DSm, while the enable signal Val1 is not present. This therefore takes place within a measurement time interval whenever a realtively high number of cells are received all of a sudden. A signal OSC is then delivered providing that it is not a scan cycle (CIX=1) that is taking place and providing that the system is not at the end of a pause (CXM=1). This signal OSC requests repressive countermeasures. Such countermeasures may cause the present cell to be eliminated and will continue for all the following cells until the end of the measurement time interval.

The signal OSC3 is also delivered when the measurement result Dm1 is equal to or greater than the number DSi while the enable signal Val1 is present at the end of a measurement time interval (or of a pause). The signal OSC is provided when neither a scan cycle nor the end of a pause is occurring. It may also cause the received cell to be eliminated and, for example, prevent the value n1x being reinitialized as described above, replacing it by forcing a value n1x=n1−DSi which would carry over the excess data rate observed in the measurement time interval that has just elapsed into the data rate of the following measurement time interval.

Figure 4:
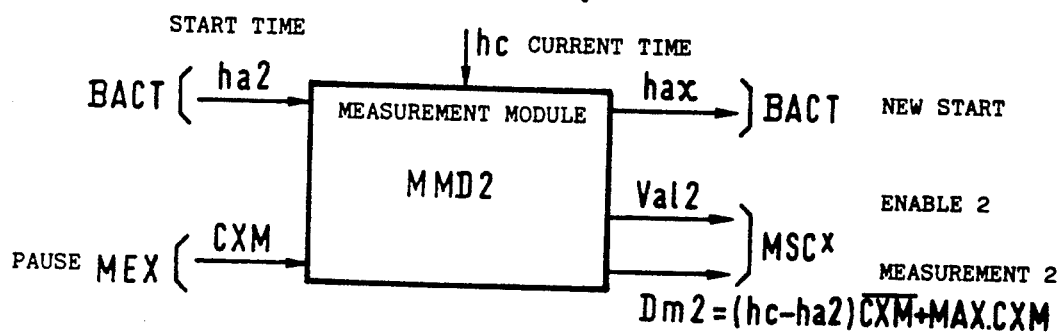
FIG. 4 shows a second measurement module MMD2 included in the processor BT of FIG. 1.

No description is given of a decision module MSC$^x$ to which the measurement module MMD2 delivers its measurement results as shown in FIG. 4. This decision module is merely a variant of the module MSC in which the threshold DSm is the minimum time interval between two cells, while the threshold DSi corresponds, for example, to the mean time interval calculated over some number of cells. According to the invention, the pause signal CXM (or even a version thereof specific to this method of evaluation, as described above), prevents the signal OSC giving rise to repressive countermeasures in the same manner as applied to the decision module MSC so long as the evaluation that would otherwise give rise thereto takes place at the end of a pause in the transmission of cells on the virtual circuit.

Figure 6:
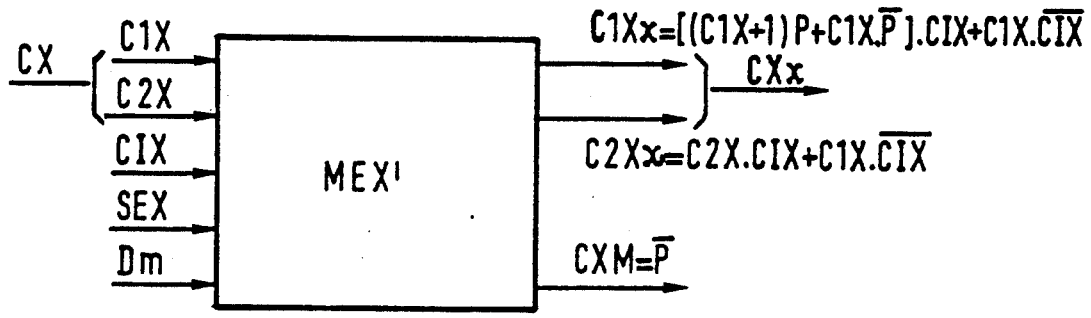
FIG. 6 shows a scan circuit module MEX' which constitutes a variant embodiment of the module MEX of FIG. 2 and which makes it possible to separate observation of the content of a context from the action taken in response to said observation.

With reference to FIG. 6, there remains to be described a scan circuit module MEX' which constitutes a variant of the module MEX shown in FIG. 2.

This module is designed particularly, but not exclusively, for the case where the data rate evaluation apparatus is implemented, at least in part, by means of a programmed device such as a microprocessor. Under such circumstances, it is advantageous to enable microprocessor operation during cyclic scanning to be interrupted by the priority data rate evaluation processing triggered by the arrival of a cell. Under such circumstances, while cyclic scanning is being performed for a given context, provision must be made for the case where the arriving cell requests data rate evaluation treatment of the same context. As described above, such evaluation processing changes the context. Unfortunately, the interrupted cyclic scan processing will be unaware of the change and it will, in turn, change the context as though nothing had happened, but on the basis of the information provided by the context before the interrupt, thereby giving rise to changed information that is wrong. This can subsequently give rise to a wrong decision concerning the cells of the virtual circuit in question.

To avoid this, and as shown in FIG. 6, the value CX in the context delivered to the module MEX' by the block BACT now comprises two separate values C1X and C2X, while the other data remains the same as shown in FIG. 2. The value C1X constitutes a scan cycle counter and this value is changed by the cyclic scan processing, whereas the value C2X is a beginning-of-count mark and its value is changed by evaluation processing of the context. The module MEX' causes both of these two values to change by delivering new values C1Xx and C2Xx which together constitute the updated value of CXx in a manner described below.

It is assumed that the value C1X and C2X are initially equal and the case of a scanning cycle is described such that the control signal CIX is present. In the module MEX', an intermediate value P is generated by comparing the difference C1X−C2X with the threshold value SEX. If C1X−C2X<SEX, then P=1. In this case, as shown in the figure, C1Xx=C1X+1. Otherwise, if C1X−C2X is equal to or greater than SEX, then the intermediate value P is zero and C1Xx=C1X. In other words, the counter C1X starts from a position given by C2X and advanced step by step until it reaches a difference specified by the threshold SEX relative to the starting position as given by C2X, whereupon it stops. Incidentally, it may be observed that the mark C2X is maintained (i.e. C2Xx=C2X while CIX=1).

Further, as shown in the figure, the module MEX' provides the pause signal CXM when P=0 ($\overline{P}$=1). Thus, as for the module MEX of FIG. 2, with the module MEX' of FIG. 6 the context CT of each virtual circuit specifies a number of scan cycles after which the pause signal CXM is to be provided, indicating that cell transmission has been interrupted for a relatively long period of time and that consequently the data rate evaluation process must be modified.

During evaluation processing, the control signal CIX is absent. As can be seen in FIG. 6, the value C1X is then unchanged (C1Xx=C1X so long as CIX=0 or $\overline{CIX}$=1), whereas the mark C2X is aligned on the value C1X (i.e. C2Xx=C1X). This returns to the initial conditions which are re-established each timer a cell arrived.

The variant of the module MEX as shown in FIG. 6 provides the advantage that if cyclic scan processing is interrupted after reading C1X, since this value is now conserved, the evaluation processing that gave rise to the interrupt does not change it. It changes the mark C2X. After the interrupt is over, and when cyclic scanning processing restarts, the counter C1X is advanced by one step, which corresponds exactly to switching over to cyclic scanning immediately after a cell has arrived, except if the intermediate value P had already been established with the value one, which would then correspond exactly to switching to cyclic scanning immediately before the cell arrived. The interrupt therefore has no disadvantageous consequences.

Naturally the above description is given purely by way of non-limiting example and numerous variants may be envisaged without going beyond the scope of the invention.

I claim:

1. An apparatus for evaluating a data rate of virtual circuits conveying cells and occupying an asynchronous time-multiplexed transmission path, the apparatus comprising: a memory in which each virtual circuit is allocated space containing "context" data, defining data rate evaluation conditions of the virtual circuit and containing information resulting from earlier stages in evaluation, a clock organized to deliver a current time, processor means coupled to said memory and said clock for reading a context of a given virtual circuit to which a given cell belongs upon reception of said given cell, said context containing a starting time which was the current time as observed and recorded when an earlier cell of said given virtual circuit was received, said processor means subtracting said starting time from a present current time to establish a time difference, and said processor means evaluating said data rate in accordance with the time difference together with a number of cells observed between said given cell and the earlier cell, wherein the apparatus further includes means for cyclically scanning said context and, during said cyclic scanning, incrementing a scan cycle counter in each context, which counter has an initial position, together with additional means responsive to the arrival of a cell for reading the scan cycle counter, determining the position of said scan cycle counter relative to its initial position, and when said relative position corresponds to a given number of scan cycles, said given number being greater than one, inhibiting any repressive countermeasures.

2. An apparatus according to claim 1, wherein said given number is a threshold value recorded in the context.

3. An apparatus according to claim 1, wherein said initial position is a determined position such as a zero, and wherein said scan cycle counter is reset to its initial position whenever data rate evaluation processing is being performed for each received cell that refers to the context under consideration.

4. An apparatus according to claim 1, wherein said initial position is given by a marker value recorded in the context, and wherein the position of said scan cycle counter is written into the context as a new initial position during the data rate evaluation processing of each received cell that refers to the context under consideration.

5. An apparatus according to claim 1, wherein the apparatus further includes means for giving a maximum value that said time difference takes up and for giving a minimum value taken up by the counted number of cells, for the purpose of restarting the evaluation process from a situation in which it is assumed that no cell has been received during a maximum time interval to be taken into consideration.

* * * * *